(12) United States Patent
Bessette

(10) Patent No.: US 9,723,771 B2
(45) Date of Patent: Aug. 8, 2017

(54) LEAF SHOVEL

(71) Applicant: Barry Bessette, Harwichport, MA (US)

(72) Inventor: Barry Bessette, Harwichport, MA (US)

( * ) Notice: Subject to any disclaimer, the term of this patent is extended or adjusted under 35 U.S.C. 154(b) by 0 days.

(21) Appl. No.: 14/988,955

(22) Filed: Jan. 6, 2016

(65) Prior Publication Data

US 2017/0188504 A1    Jul. 6, 2017

(51) Int. Cl.
*A01B 1/20* (2006.01)
*A01B 1/22* (2006.01)
*A01D 9/00* (2006.01)
*A01D 11/00* (2006.01)
*A01B 1/02* (2006.01)
*B25G 3/20* (2006.01)
*B25G 3/38* (2006.01)

(52) U.S. Cl.
CPC ............... *A01B 1/02* (2013.01); *B25G 3/20* (2013.01); *B25G 3/38* (2013.01)

(58) Field of Classification Search
CPC .... A01D 7/10; A01D 7/00; E01H 5/02; E01H 1/1206; A01K 23/005; A01B 1/02; A01B 1/18; B25G 3/20; B25G 3/38
See application file for complete search history.

(56) References Cited

U.S. PATENT DOCUMENTS

| | | | | |
|---|---|---|---|---|
| 956,968 A | * | 5/1910 | Hubert | A47L 13/52 15/257.4 |
| 1,605,534 A | * | 11/1926 | Dupre | A47L 13/52 15/257.4 |
| 1,645,806 A | * | 10/1927 | Fries | A47L 13/52 15/257.4 |
| 2,176,135 A | * | 10/1939 | Horst | A47L 13/52 15/257.4 |
| 2,263,177 A | * | 11/1941 | Lewis | A47L 13/52 15/257.4 |
| 3,264,809 A | | 8/1966 | Jackson | |
| 3,350,866 A | | 11/1967 | Spencer | |
| 3,453,676 A | * | 7/1969 | Albert | A47L 13/52 15/104.8 |
| 3,971,095 A | * | 7/1976 | Fish, Sr. | A47L 13/52 15/144.4 |
| 4,225,174 A | | 9/1980 | Hennessy et al. | |
| 4,378,671 A | | 4/1983 | Gascon | |
| 4,991,386 A | | 2/1991 | Dirksen | |
| 5,458,385 A | | 10/1995 | Peeples | |
| 5,459,988 A | | 10/1995 | Glaser | |
| 5,881,545 A | * | 3/1999 | Wilson | A01B 1/02 294/50.9 |

(Continued)

FOREIGN PATENT DOCUMENTS

| | | |
|---|---|---|
| CA | 2309866 | 1/2006 |
| WO | 02080653 | 10/2002 |
| WO | 2006133734 | 12/2006 |

*Primary Examiner* — Stephen Vu
(74) *Attorney, Agent, or Firm* — Lambert & Associates; Gary E. Lambert; David J. Connaughton, Jr.

(57) ABSTRACT

A leaf shovel for shoveling leaves and other debris is provided. The shovel has a cover movable between an open position for gathering leaves on the blade of the shovel, to a closed position for retaining the leaves on the blade of the shovel. Once the cover is in the closed position, the shovel may be moved to the desired receptacle, holding the leaves in place. The cover is then moved to an open position to dump the leaves out of the shovel.

20 Claims, 2 Drawing Sheets

(56) References Cited

U.S. PATENT DOCUMENTS

| | | | | |
|---|---|---|---|---|
| 5,901,540 | A | * | 5/1999 | Vella ........................ A01D 7/10 294/50.6 |
| 6,120,073 | A | | 9/2000 | Jones |
| 6,134,869 | A | * | 10/2000 | Barrett ..................... A01D 7/10 294/50.6 |
| 6,367,236 | B1 | | 4/2002 | Marcone |
| D555,316 | S | * | 11/2007 | Hay ............................... D32/74 |
| 7,695,035 | B2 | * | 4/2010 | Sumner ............... A01K 27/004 294/1.4 |
| 8,234,434 | B2 | * | 7/2012 | Cheah ................... G11B 31/00 710/301 |
| 8,550,511 | B2 | * | 10/2013 | Baars ........................ E01H 1/12 294/1.3 |

* cited by examiner

LEAF SHOVEL

BACKGROUND OF THE INVENTION

Field of the Invention

The present invention relates generally to leaf, or other particulate, movement devices. More particularly the present invention relates to a shovel having an openable and closeable cover which can be opened for when leaves are being scooped, and closed for moving the leaves to a receptacle or the like.

Description of Related Art

Cleanup of fallen leaves and other debris can be a time consuming and challenging task. During the fall, leaves fall from trees and collect on the ground. In a yard, such as a residential back yard, these leaves must be collected and removed as part of general yard upkeep and maintenance. Typically, the process involves raking or otherwise gathering the leaves into a pile, and then moving the pile of leaves to a receptacle for removal. The receptacle is typically any of a bag, bin, barrel, back of a truck, wheelbarrow, buckets, and the like.

While there are many technologies for gathering the leaves into a pile, such as rakes, blowers, and the like, moving them from this pile away from the yard remains a challenge. Typical tools such as shovels do not gather many leaves because of the shape, weight, and nature of the leaves. When shoveling leaves using a typical shovel, the leaves slide or fall off the shovel. Two rakes may be used to scoop and hold a quantity of leaves, but this is cumbersome, at best.

Therefore, what is needed is a tool that can allow rapid collection of leaves for, among other uses, movement from the ground to a receptacle.

SUMMARY OF THE INVENTION

The subject matter of this application may involve, in some cases, interrelated products, alternative solutions to a particular problem, and/or a plurality of different uses of a single system or article.

In one aspect, a leaf shovel is provided. The leaf shovel has an elongate handle with a blade attached to a distal end. A cover is attached to the shovel blade by a hinge. The hinge allows the cover to move between an open position exposing a top surface of the blade, to a closed position extending over the top surface of the blade and covering the blade. In use this allows a user to drive the shovel under the leaves when the cover is in the open position, and move the leaves effectively when the cover is in the closed position by the cover holding the leaves in place on the blade.

In another aspect, a leaf shovel is provided having a cover removably attached to an elongate handle of the shovel. The leaf shovel has an elongate handle with a blade attached to a distal end. A cover is attached to the handle by a hinge. The hinge allows the cover to move between an open position exposing a top surface of the blade, to a closed position extending over the top surface of the blade and covering the blade.

DETAILED DESCRIPTION

Figure 1:
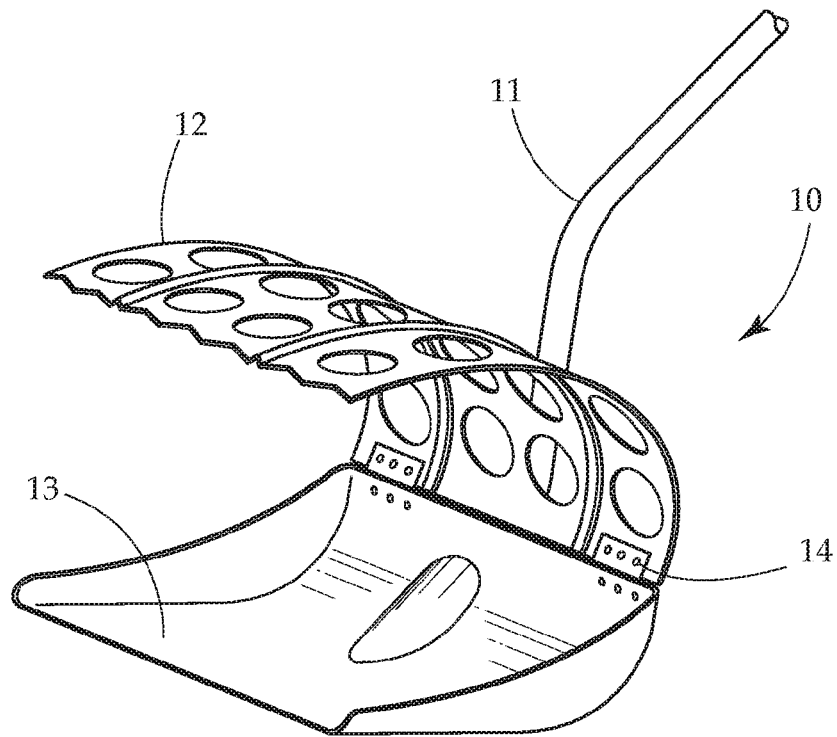
FIG. 1 provides a side view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a leaf shovel having a handle, a blade, and a cover movable from an open position to allow scooping using the shovel, to a closed position to hold a quantity of leaves or other material in place on the shovel when lifting and moving the shovel with the contents in the blade. The cover may be movable between the open and closed positions in a number of different manners. Typically, this movement is achieved by a hinged connection between the cover and either the blade of the shovel or the handle/shaft portion of the shovel, but other embodiments are also within the scope of this invention.

In one embodiment, the leaf shovel of the present invention may have a handle, which may be an elongate shaft, a shovel blade connected at a distal end of the handle, and a cover hingedly connected to one of the handle and the blade, movable from the open to closed position.

The shovel handle may be any elongate shape capable of allowing a user to drive the blade of the shovel under or into a pile of debris, and lift the blade upwardly. In varying embodiments, the handle may be a straight elongate shaft, or the shaft may have a bend in it along its length. In one embodiment, the bend may be between 15 and 100 degrees. The handle may be formed of any material. For example, materials of which the handle may be made include, but are not limited to, wood, metal, plastic, carbon fiber, fiberglass and other composite materials, and the like. In some embodiments, the handle may have a hand-hold at a proximal end.

The blade of the shovel may be any type of shovel blade capable of being driven under or into a pile of debris. Typically, the blade may be similar to that of a snow shovel, but any blade shaping or configuration may be used. The blade is attached to an end of the shovel handle. The blade may be formed of any material. For example, materials of which the blade may be made include, but are not limited to, wood, metal, plastic, carbon fiber, fiberglass and other composite materials, and the like.

The cover may be hingedly connected to at least one of the handle and the blade. In one embodiment, the cover may be connected to a rear of the blade (proximal to the handle) by a hinge. In another embodiment, the cover may be removably fitted to the handle shaft, for example by a clip. In yet another embodiment, the cover may be removably fitted to the blade. The hinged connection of this embodiment is the structure that allows the cover to move between the open position allowing debris to be loaded onto the shovel blade, and the closed position holding the debris on the shovel blade. Typically this hinged movement may be approximately 90 degrees, +/−30 degrees, depending on embodiment. The cover may be formed of any material. For example, materials of which the cover may be made include, but are not limited to, wood, metal, plastic, carbon fiber, fiberglass and other composite materials, and the like. In many embodiments, the cover is weighted so as to somewhat tightly hold the debris on the blade in place by virtue of the weight against the debris.

The cover may be of any shape. In one embodiment, the cover has a curved shape that is concave with respect to the blade. The cover may have teeth on a front leading edge away from the handle in some embodiments. In one embodiment, to reduce weight, the cover may have one or a plurality of perforations or openings through its surface. In still another embodiment, reinforcing structures may extend widthwise or lengthwise along the cover to increase rigidity.

In an embodiment of use of the present invention, a user may grasp the handle to manipulate the shovel so that the cover is in the open position. This may be done by tilting the shovel backwards so that the cover falls open, or by leaning it to the side or upside down to urge the cover open, again by gravity. When in the open position, the blade may be driven under or into a quantity of leaves (or other material). Upon an abrupt stopping, which is common in natural shoveling motions, the momentum of the cover may carry it to the closed position. Alternatively, if the cover does not close during the natural shoveling motion, the shovel could be tilted forward to cause the cover to fall to the closed position, or a user may push a foot against the cover to cause it to close. When in the closed position, the cover holds the leaves or other debris in place on the blade. The shovel may then be lifted upward towards a receptacle (back of truck, wheelbarrow, bag, bucket, barrel, etc.) When over the receptacle, the shovel may be tilted sideways (perpendicular to the ground), to a position where a portion of the blade is above the cover, or towards an upside down position (parallel to ground). This moves the cover to the open position by gravity and the leaves are allowed to fall out of the shovel, off the blade into the receptacle. Then process may then be repeated.

While the present invention is described largely with respect to use with leaves, it should be understood that the shovel may be used with any other particulate material or debris, without straying from the scope of the present invention. The present invention may be similarly effective when used with, for example, grass clippings, mulch, soil, quantities of waste or trash, and the like.

Turning now to FIG. 1, a side view of an embodiment of the leaf shovel is provided. The shovel 10 has an elongate handle 11. At a distal end of the handle 11, a blade 13 is attached. In this embodiment, the blade 13 is formed as a common snow shovel blade. The blade 13 has two side walls and a rear wall. However, it should be understood that any shaped blade may be used. Cover 12 has a rounded cross-sectional shape and is concave facing blade 13. In this embodiment, cover 12 is hingedly connected to the rear wall of blade 13 via hinge 14. Hinge 14, in this embodiment, is a low friction hinge that allows free movement of cover between the open position, as shown here, to a closed position (see FIG. 2) by a movement of the shovel.

Figure 2:
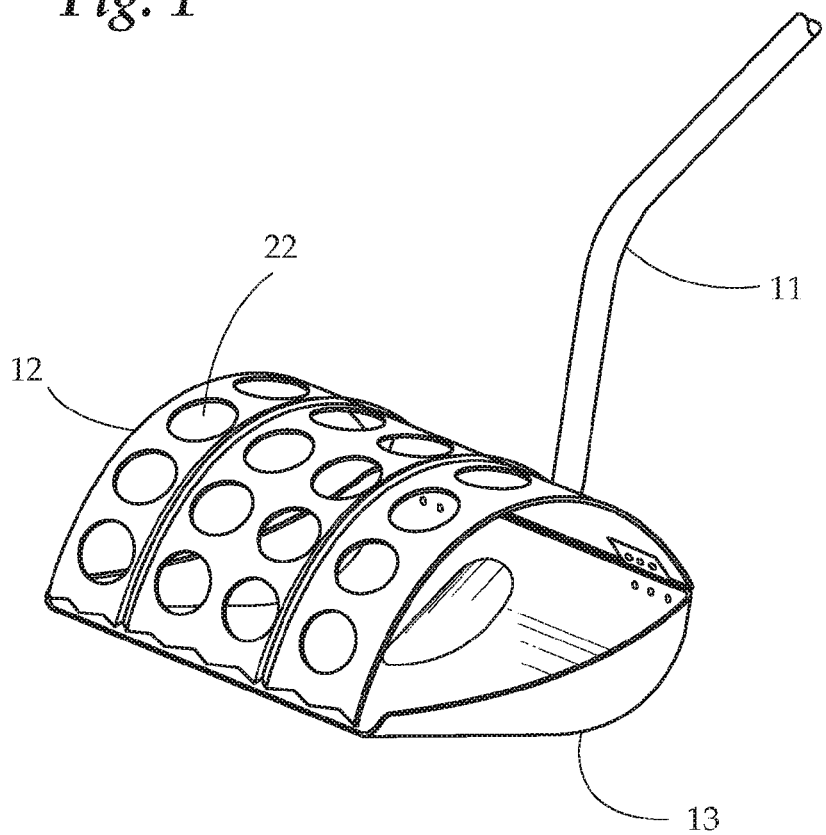
FIG. 2 provides a side view of another embodiment of the present invention.

FIG. 2 shows another embodiment of the leaf shovel. The shovel 10 has an elongate handle 11. At a distal end of the handle 11, a blade 13 is attached. Cover 12 is hingedly connected to a rear wall of blade 13 via hinge 14. In this view, the cover 12 is in the closed position, which is the position that it would be in when the blade 13 is loaded with leaves. In the closed position, this embodiment shows the cover 12 extending beyond a distal end of the blade 13. As shown, cover 12 has a plurality of holes 22 formed through its surface. These holes 22 may allow for a decrease in weight of the cover 12 (and thus the shovel as a whole). Also, the holes 22 allow a user to visually monitor the quantity of leaves held by the blade 13.

Figure 3:
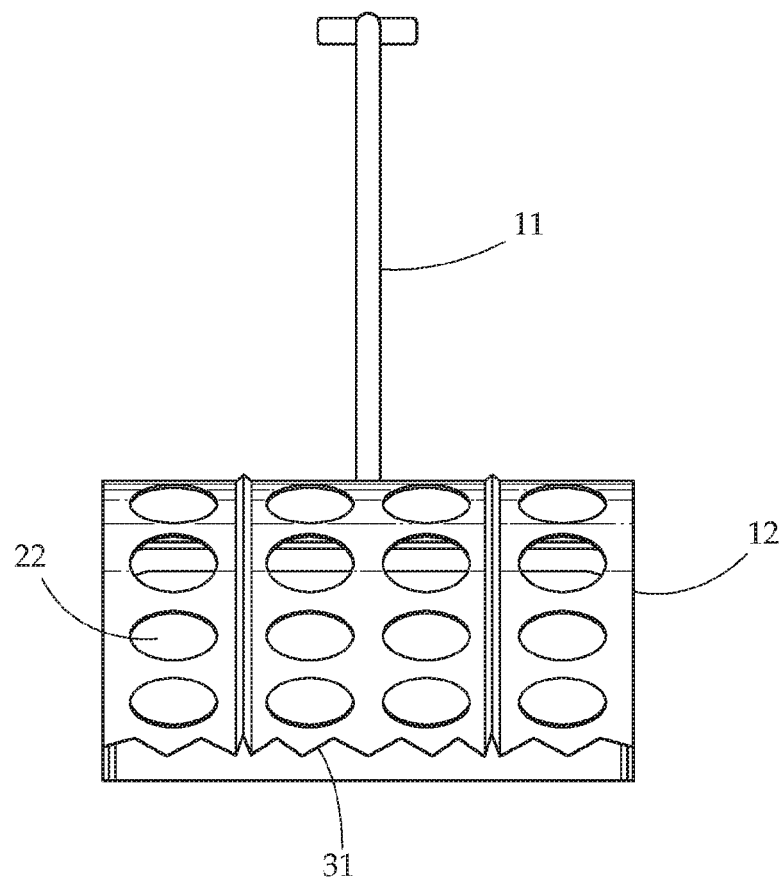
FIG. 3 provides a frontal view of yet another embodiment of the present invention.

FIG. 3 provides a front view of an embodiment of the leaf shovel. In this embodiment, the handle 11 is bent along its length. In other embodiments, handle may be straight, curved, or have other shapes, without straying from the scope of the present invention. Cover 12 is shown in the closed position. Holes 22 are visible through its surface. In this embodiment, cover 12 has teeth 31 on its front leading edge. These teeth may aid in holding material in place at the distal end of the blade.

Figure 4:
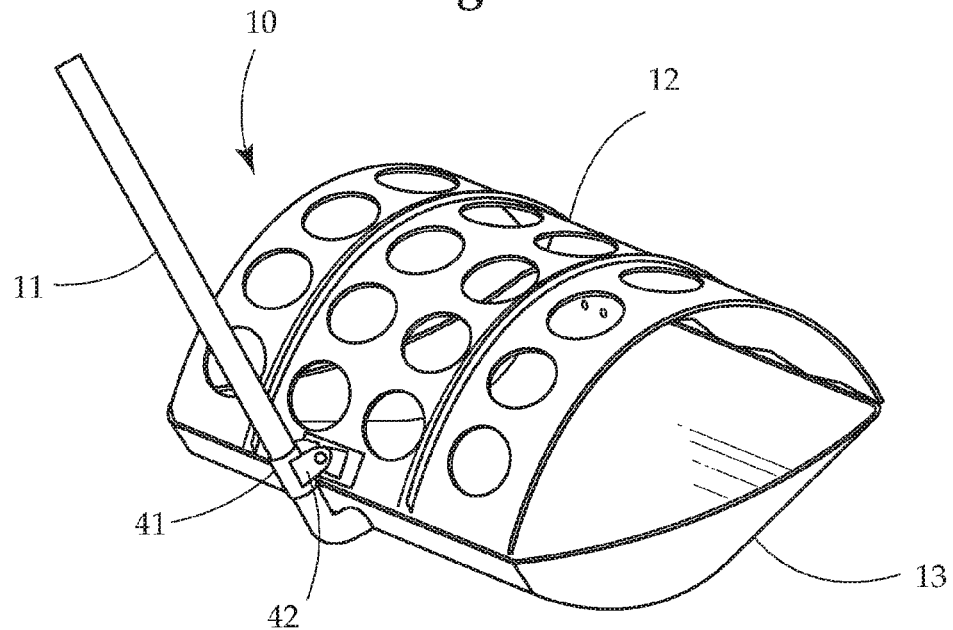
FIG. 4 provides a perspective view of still another embodiment of the present invention.

FIG. 4 provides a view of another embodiment of the shovel 10 having the cover 12 attached to the handle 11. In this embodiment, cover 12 is hingedly attached via hinge 42 to clip 41. Clip 41 is configured to be removably clipped into place on the handle 11. The clip may be any structure capable of retaining the cover 12 on the handle 11. In a particular embodiment, the clip may be 'C' shaped such that it partially wraps around the handle 11. The C-shaped clip may be flexible to allow removable attachment to the handle. In such an embodiment, an existing shovel may be retrofitted easily with the cover 12 to form the present invention. While the figures show a clip 41, it should be understood that any sort of connection to the handle may be used, including an integrated hinge, without straying from the scope of the present invention. In this view, handle 11 is bent along its length, allowing a different angling of the blade 13 than a straight handle.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A leaf shovel comprising:
    an elongate handle;
    a shovel blade attached to a distal end of the elongate handle;
    a cover attached directly to the shovel blade by a free hinge, the cover movable between an open position exposing a top surface of the blade, to a closed position extending over the top surface of the blade and covering the blade, the cover movable about the free hinge by gravity or momentum between the open position and the closed position depending on an orientation of the elongate handle, a cavity defined between the cover and the blade when in the closed position; and
    wherein the cover is configured to move from the closed position to the open position by gravity when tilted to a position having at least a portion of the blade above the cover.

2. The leaf shovel of claim 1 wherein the elongate handle comprises a bend along its length.

3. The leaf shovel of claim 1 wherein the shovel blade further comprises a side wall on each side of the blade, and a rear wall on a rear of the blade.

4. The leaf shovel of claim 3 further comprising a hinge connecting the cover to the rear wall of the blade.

5. The leaf shovel of claim 1 wherein the cover comprises a plurality of teeth on a distal end.

6. The leaf shovel of claim 1 wherein the cover has a concave shape facing the shovel blade, the concave shape defining the cavity.

7. The leaf shovel of claim 1 wherein the cover defines a plurality of holes through its surface.

8. The leaf shovel of claim 1 wherein a distal end of the cover extends beyond a distal end of the shovel blade when in the closed position.

9. The leaf shovel of claim 1 wherein the shovel blade is concave in shape facing the cover.

10. A leaf shovel comprising:
an elongate handle;
a shovel blade attached to a distal end of the elongate handle;
a cover attached directly to the elongate handle by a free hinge, the cover movable between an open position exposing a top surface of the blade, to a closed position extending over the top surface of the blade and covering the blade, the cover movable about the free hinge by gravity or momentum between the open position and the closed position depending on an orientation of the elongate handle a cavity defined between the cover and the blade when in the closed position; and
wherein the cover is configured to move from the closed position to the open position by gravity when tilted to a position having at least a portion of the blade above the cover.

11. The leaf shovel of claim 10 wherein the elongate handle comprises a bend along its length.

12. The leaf shovel of claim 10 wherein the shovel blade further comprises a side wall on each side of the blade, and a rear wall on a rear of the blade.

13. The leaf shovel of claim 10 wherein the cover is removably connected to the handle by a clip.

14. The leaf shovel of claim 13 wherein the clip is a 'C' shaped clip configured to wrap partially about the elongate handle, the cover connected to the clip by a hinge.

15. The leaf shovel of claim 10 wherein the cover comprises a plurality of teeth on a distal end.

16. The leaf shovel of claim 10 wherein the cover has a concave shape facing the shovel blade, the concave shape defining the cavity.

17. The leaf shovel of claim 10 wherein a distal end of the cover extends beyond a distal end of the shovel blade when in the closed position.

18. The leaf shovel of claim 10 wherein the shovel blade is concave in shape facing the cover.

19. An assembly for connection to a handle of a shovel, the assembly comprising:
a clip, the clip configured to be removably attached to the handle of the shovel, the handle being an elongate shaft;
a cover, the cover connected to the clip by a free hinge, and configured to be movable between an open position exposing a top surface of a blade of the shovel, to a closed position extending over the top surface of the blade and covering the blade, the cover movable about the free hinge by gravity or momentum between the open position and the closed position depending on an orientation of the clip, such that a cavity is defined between the cover and the blade when in the closed position when the cover is attached to the handle;
the cover rotatable with respect to the clip by the hinge between the open and closed position; and
wherein the cover, when attached to the handle of the shove, is configured to move from the closed position to the open position by gravity when tilted to a position having at least a portion of the blade above the cover.

20. The assembly for connection to a handle of a shovel of claim 19 wherein the cover has a concave shape.

* * * * *